(12) United States Patent
Sehrawat

(10) Patent No.: US 12,457,118 B1
(45) Date of Patent: Oct. 28, 2025

(54) VERIFICATION OF QUANTUM RANDOMNESS USING CLASSICAL HARDWARE WITH ONE ROUND OF COMMUNICATION

(71) Applicant: Circle Internet Group, Inc., New York, NY (US)

(72) Inventor: Vipin Singh Sehrawat, Fremont, CA (US)

(73) Assignee: Circle Internet Group, Inc., Boston, MA (US)

( * ) Notice: Subject to any disclaimer, the term of this patent is extended or adjusted under 35 U.S.C. 154(b) by 105 days.

(21) Appl. No.: 18/585,847

(22) Filed: Feb. 23, 2024

(51) Int. Cl.
 *H04L 29/06* (2006.01)
 *H04L 9/32* (2006.01)

(52) U.S. Cl.
 CPC .......... *H04L 9/3278* (2013.01); *H04L 9/3297* (2013.01)

(58) Field of Classification Search
 None
 See application file for complete search history.

(56) References Cited

U.S. PATENT DOCUMENTS

| | | | |
|---|---|---|---|
| 2020/0225673 A1* | 7/2020 | Ebrahimi Afrouzi | A47L 11/4011 |
| 2022/0014386 A1* | 1/2022 | Sehrawat | H04L 63/0876 |

OTHER PUBLICATIONS

[No Author Listed] [online], "Interoperable Randomness Beacons," Nov. 5, 2023, via Internet Archive: Wayback Machine URL <https://web.archive.org/web/20231105060720/https://csrc.nist.gov/Projects/interope rable-randomness-beacons/beacon-20>, retrieved on Feb. 22, 2024, <https://csrc.nist.gov/Projects/interoperable-randomness-beacons/beacon-20>, 4 pages.

Bassham III, et al., "A Statistical Test Suite for Random and Pseudorandom No. Generators for Cryptographic Applications," National Institute of Standards and Technology, Apr. 2010, 1-131.

Brakerski et al., "A Cryptographic Test of Quantumness and Certifiable Randomness from a Single Quantum Device," CoRR, Submitted on Sep. 2018, arXiv:1804.00640, 44 pages.

Brakerski et al., "Worst-Case Hardness for LPN and Cryptographic Hashing via Code Smoothing," Presented at the Proceedings of the International Association for Cryptologic Research, Darmstadt, Hesse, Germany, May 19-23, 2019, 1-16.

(Continued)

*Primary Examiner* — Andrew J Steinle
(74) *Attorney, Agent, or Firm* — Fish & Richardson P.C.

(57) ABSTRACT

Methods, systems, and apparatus for verifying quantum randomness. In one aspect a computing device receives data from a quantum computer. The data includes a timestamp, a binary-valued vector, and a predicted response to a challenge string. The predicted response to the challenge string is generated using a regression model that has been trained to fit LPN instances as a linear function, where the LPN instances are constructed using a physically unclonable function. The computing device determines a parity of a random number output by a public source of randomness at a time specified by the timestamp and performs either a generation round or a test round based on the parity to verify the randomness of a bit generated by the quantum computer. The generation round uses the data to verify a preimage of the binary-valued vector and the test round uses the data to verify an equation.

20 Claims, 5 Drawing Sheets

(56) References Cited

OTHER PUBLICATIONS

Brown [online], "Dieharder: A random No. test suite," Dec. 22, 2023, via Internet Archive: Wayback Machine URL <https://web.archive.org/web/20231222081556/https://webhome.phy.duke.edu/~rgb/General/dieharder.php>, retrieved on Feb. 22, 2024, <https://webhome.phy.duke.edu/~rgb/General/dieharder.php>, 9 pages.

Doosti et al., "On the connection between quantum pseudorandomness and quantum hardware assumptions," Quantum Science and Technology, Apr. 29, 2022, 7(3):1-24.

Eastlake III, et al., "Randomness Recommendations for Security," RFC1750, Dec. 1994, 1-30.

Kavulich et al., "Searching for evidence of algorithmic randomness and incomputability in the output of quantum random No. generators," Physics Letters A, Feb. 2021, 388(127074):9 pages.

Lim, "Extracting Secret Keys from Integrated Circuits," Massachusetts Institute of Technology, Jun. 2004, 1-119.

Mahadev et al., "Efficient Certifiable Randomness from a Single Quantum Device," CoRR, Submitted on Apr. 2022, arXiv:2204.11353, 16 pages.

Micciancio et al., "Trapdoors for Lattices: Simpler, Tighter, Faster, Smaller," Presented at the Proceedings of the Annual International Conference on the Theory and Applications of Cryptographic Techniques, Cambridge, England, UK, Apr. 15- 19, 2012, 700-718.

Ravikanth et al., "Physical One-Way Functions," Massachusetts Institute of Technology, Jun. 2001, 297(5589):2026-2030.

Sehrawat et al., "Star-Specific Key-Homomorphic PRFs From Learning With Linear Regression," IEEE Xplore, Jul. 2023, 11:73235-73267.

Van Dijk et al., "A Theoretical Framework for the Analysis of Physical Unclonable Function Interfaces and Its Relation to the Random Oracle Model, " Journal of Cryptology, 36(35):1-64.

Yamakawa et al., "Verifiable Quantum Advantage without Structure," CoRR, Submitted on Jun. 17, 2022, arXiv:2204.02063, 52 pages.

\* cited by examiner

VERIFICATION OF QUANTUM RANDOMNESS USING CLASSICAL HARDWARE WITH ONE ROUND OF COMMUNICATION

TECHNICAL FIELD

This specification generally relates to methods, systems, and devices for testing quantum computing devices.

BACKGROUND

Randomness is a central component of many cryptographic and non-cryptographic (e.g., randomized) protocols. However, a classical computing device can at best generate pseudorandom sequences, which are, by definition, Turing computable and have low Kolmogorov complexity. Such pseudorandom sequences are referred to as random because the sequences typically have a distribution of bits that is without observable regularities against a (probabilistic) polynomial-time external observer. In classical computing, true randomness must either be introduced through a hardware event (e.g., tunneling and breakdown noise from Zener diode, inherent semiconductor thermal noise, free-running oscillators, hard-disk seek time) or directly injected from outside.

Quantum computing devices can generate true randomness because the inherent nature of quantum mechanics is random. However, efficient certification of true randomness is a non-trivial challenge for several reasons. For example, passing statistical tests, such as The National Institute of Standards and Technology (NIST) and Diehard randomness tests, does not establish true randomness as it is not possible to certify the randomness with finite computational power. Further, verifying the quantum behavior (e.g., randomness) of a quantum computing device is difficult due to the computational power of the device and restrictions imposed by the laws of quantum mechanics on access to its internal state.

SUMMARY

This specification describes systems and methods for verifying quantum randomness using classical computing hardware and one round of communication.

In general, innovative aspects of the subject matter described in this specification can include actions for verifying randomness produced by a quantum computing device, the actions including receiving, by a classical computing device and from the quantum computing device, data comprising a timestamp, a binary-valued vector, and a predicted response to a challenge string, wherein the predicted response to the challenge string is generated by the quantum computing device using a regression model that has been trained on training data during a setup process to fit learning parity with noise (LPN) instances as a linear function, and the LPN instances are constructed by the classical processing device using a physically unclonable function (PUF); determining, by the classical computing device, a parity of a random number output by a public source of randomness at a time specified by the timestamp; and performing, by the classical computing device and based on the parity of the random number, either a generation round or a test round to verify the randomness of a bit generated by the quantum computing device, wherein the generation round uses the binary-valued vector and predicted response to the challenge string to verify a preimage of the binary-valued vector generated by the quantum computing device, and the test round uses the binary-valued vector to verify an equation generated by the quantum computing device.

Other implementations of this aspect include corresponding systems, apparatus, and computer programs, configured to perform the actions of the methods, encoded on computer storage devices.

These and other implementations can each optionally include one or more of the following features, alone or in combination: the time specified by the timestamp comprises a predetermined time agreed by the classical computing device and the quantum computing device, and wherein the method further comprises: determining, by the classical computing device, whether the time specified by the timestamp is equal to the predetermined time; and in response to determining that the time specified by the timestamp is equal to the predetermined time, performing the generation round or the test round; actions further include, in response to determining that the time specified by the timestamp is not equal to the predetermined time, aborting, by the classical computing device, the verification of randomness; the data further comprises a challenge string and the method further comprises: processing, by the classical computing device and using the PUF, the challenge string to compute a Bernoulli error vector; computing, by the classical computing device, a difference between the predicted response to the challenge string and the Bernoulli error vector; determining, by the classical computing device, whether a Hamming distance between i) a product of an inverse of a pre-stored LPN matrix and the difference and ii) a pre-stored random vector is within a predetermined range; and in response to determining that the Hamming distance is within the predetermined range, performing the generation round or the test round; actions further include, in response to determining that the Hamming distance is outside of the predetermined range, aborting the verification of randomness; processing the challenge string to compute the Bernoulli error vector comprises: processing, using the PUF, the challenge string twice to obtain pairs of responses to challenges in the challenge string; and computing a Bernoulli error vector using the pairs of responses, comprising, for a j-th entry of the Bernoulli error vector, computing a XOR of the pair of responses to a j-th challenge in the challenge string; actions further include performing the setup process, comprising: receiving, by the classical computing device and from the quantum computing device, a first set of random challenges and a second set of random challenges; computing, by the classical computing device, a set of responses to the first set of random challenges and a set of responses to the second set of random challenges, wherein the set of responses to the first set of random challenges include a first set of LPN instances generated using the PUF and the set of responses to the second set of random challenges include a second set of LPN instances generated using the PUF, wherein the first set of LPN instances are different to the second set; and sending, from the classical computing device, the set of responses to the first set of random challenges and the set of responses to the second set of random challenges to the quantum computing device; the quantum computing device trains a first regression model to predict challenge responses generated by the classical computing device on training data comprising the set of responses to the first set of random challenges and trains a second regression model to predict challenge responses generated by the classical computing device on training data comprising the set of responses to the second set of random challenges; computing the set of responses to the first set of random challenges comprises: generating and storing, by the classical computing device and using the PUF, a first LPN matrix, wherein the first LPN matrix comprises two random matrices and a matrix with entries sampled from a Bernoulli distribution; generating and storing, by the classical computing device, a random vector; processing, by the classical computing device and using the PUF, the first set of random challenges to generate a first Bernoulli error vector; and multiplying the first LPN matrix by the random vector and adding the first Bernoulli error vector to obtain the set of responses to the first set of random challenges, wherein the classical computing device sends the first LPN matrix to the quantum computing device; the first LPN matrix comprises a product of the two random matrices added to the matrix with entries sampled from a Bernoulli distribution; computing the set of responses to the second set of random challenges comprises: generating and storing, by the classical computing device, a second LPN matrix and a trapdoor function for the second LPN matrix; generating and storing, by the classical computing device, a random vector; processing, by the classical computing device and using the PUF, the second set of random challenges to generate a second Bernoulli error vector; and multiplying the second LPN matrix by the random vector and adding the second Bernoulli error vector to obtain the set of responses to the second set of random challenges; performing the generation round or the test round comprises sending, from the classical computing device, a second random number to the quantum computing device, wherein the quantum computing device generates a bit and a preimage of the binary-valued vector or generates a bit and a binary string based on a parity of the second random number; performing the generation round comprises: receiving a bit and a preimage of the binary-valued vector from the quantum computing device, wherein the bit is obtained through measurement of a quantum state that represents a superposition of preimages of the binary-valued vector; determining whether a norm of the binary-valued vector minus a first LPN matrix multiplied by the preimage minus the bit multiplied by the predicted response to the challenge string is less than an upper bound given by a Bernoulli distribution bias multiplied by a square root of a length of the binary-valued vector, wherein the Bernoulli distribution is used to generate the first LPN matrix; and in response to determining that the norm is less than the upper bound, verifying the bit as a random bit; performing the test round comprises: receiving a bit and a binary string from the quantum computing device; determining whether the bit is equal to a product of the binary string and a XOR of a vector and a difference between the vector and a pre-stored random vector, wherein the vector multiplied by a second LPN matrix and added to a Bernoulli error vector is equal to the binary-valued vector; and in response to determining that the bit is equal to the product, verifying the bit as a random bit; actions further include using a trapdoor function for the second LPN matrix to obtain the vector; actions further include generating, by the quantum computing device, the data, comprising: observing a random number output by a public source of randomness, wherein the random number comprises an even or an odd random number; generating the challenge string; determining whether the random number is even or odd; in response to determining that the random number is even, querying a first regression model with the challenge string to obtain the predicted response to the challenge string; or in response to determining that the random number is even, querying a second regression model with the challenge string to obtain the predicted response to the challenge string, wherein the first regression model and the second regression model have been trained on different training data; generating the binary-valued vector; and using the binary-valued vector and the predicted response to the challenge string to generate a superposition of preimages of the binary-valued vector; the classical processing device performs the generation round, if the parity of the random number is even or performs the test round, if the parity of the random number is odd; the PUF comprises a strong implicit PUF.

Some implementations of the subject matter described herein may realize, in certain instances, one or more of the following advantages.

The presently described quantum randomness verification protocol requires less rounds of communication between a quantum prover and a classical verifier (e.g., compared to existing verification protocols). In particular, the verification phase of the presently described quantum randomness verification protocol requires only one round of communication (per verification round). In addition, performing this single round of communication not only enables the classical verifier to verify the randomness of the quantum prover, but also authenticates the classical verifier to the quantum prover.

Further, the presently described quantum randomness verification protocol is based on hardware-based cryptographic functions (e.g., physically unclonable functions (PUFs), post-quantum cryptography). The security associated with hardware based cryptographic functions and post-quantum problems provides increased robustness since, even if the post-quantum problem has an efficient quantum attack against it in the future, the hardware guarantees would remain intact.

Further, the presently described quantum verification protocol is robust against a cheating quantum prover due to the use of a public source of quantum randomness.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for verifying quantum randomness generated by a quantum prover. In a setup phase, a classical verifier uses a physically unclonable function (PUF) to generate two sets of training data. One set of training data includes learning parity with noise instances generated using a random matrix. The other set of training data includes learning parity with noise instances generated using a low-rank "lossy" matrix. The two sets of training data are indistinguishable from the viewpoint of the quantum prover. The quantum prover trains respective regression models on the sets of training data.

In a verification phase, the classical verifier verifies the randomness of a bit generated by the quantum prover. The quantum prover observes a random number from a public source of randomness and uses the parity of the number to query one of the regression models with a challenge string. The quantum prover provides the output of the queried regression model to the classical verifier. The classical verifier performs a sequence of verification processes using the output of the regression model and matrices/vectors generated and stored during the setup phase. The verification processes are based on, for example, the randomness generated by the public source of randomness and properties of the PUF used by the classical verifier.

In some implementations, actions for verifying randomness produced by a quantum computing device include receiving, by a classical computing device and from the quantum computing device, data comprising a timestamp, a binary-valued vector, and a predicted response to a challenge string, wherein the predicted response to the challenge string is generated by the quantum computing device using a regression model that has been trained on training data during a setup process to fit learning parity with noise (LPN) instances as a linear function, and the LPN instances are constructed by the classical processing device using a physically unclonable function (PUF); determining, by the classical computing device, a parity of a random number output by a public source of randomness at a time specified by the timestamp; and performing, by the classical computing device and based on the parity of the random number, either a generation round or a test round to verify the randomness of a bit generated by the quantum computing device, wherein the generation round uses the binary-valued vector and predicted response to the challenge string to verify a preimage of the binary-valued vector generated by the quantum computing device, and the test round uses the binary-valued vector to verify an equation generated by the quantum computing device.

Figure 1:
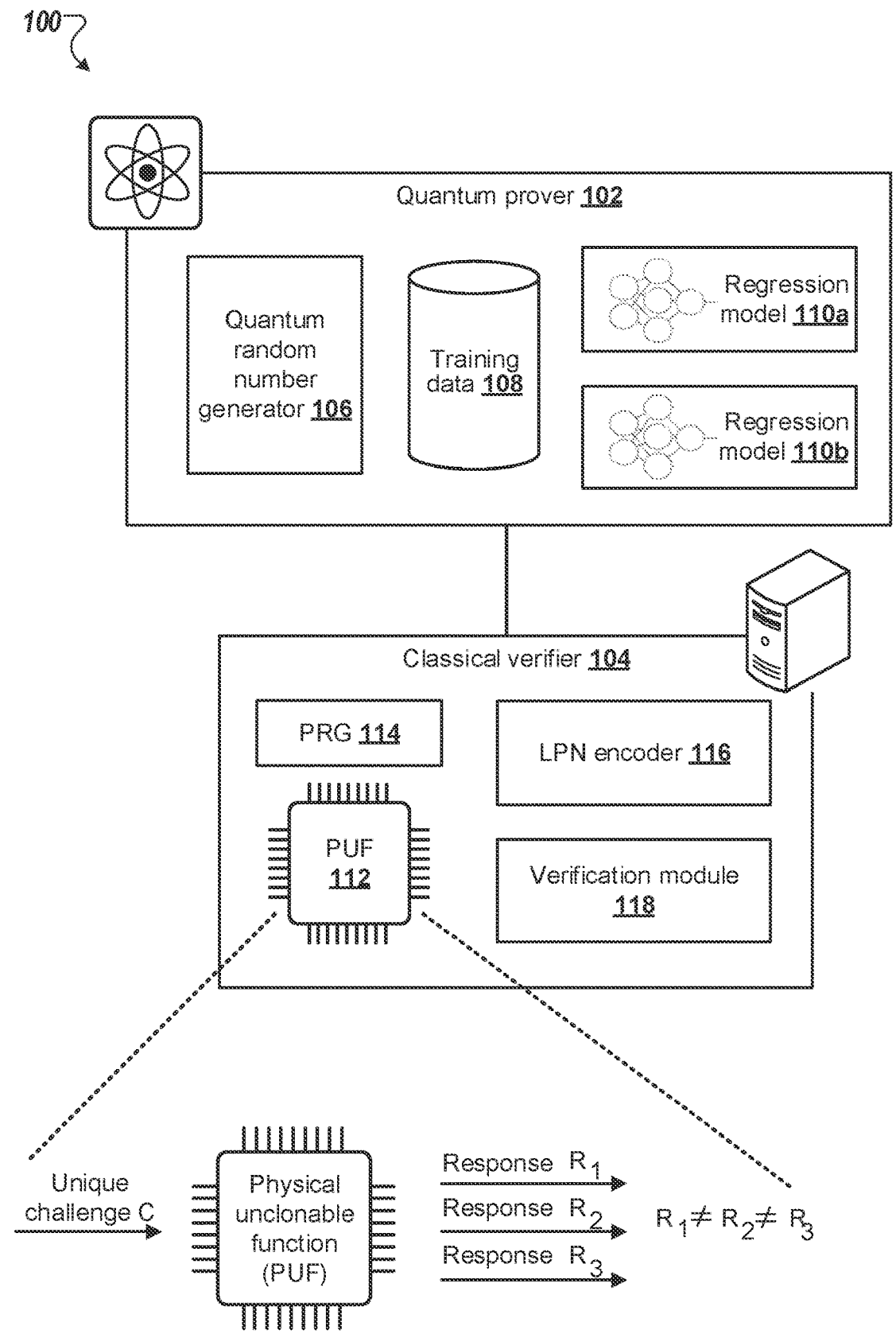
FIG. 1 is a block diagram of an example quantum verification system.

FIG. 1 is a block diagram of an example quantum verification system 100. The example quantum verification system 100 includes a quantum prover 102 and a classical verifier 104. The quantum prover 102 and a classical verifier 104 can be connected over a network (e.g., a local area network (LAN), wide area network (WLAN), the Internet, or a combination thereof). The network can be accessed over a wired and/or a wireless communications link.

The quantum prover 102 is a quantum computing system that is configured to perform both classical and quantum operations. The quantum computing system can be implemented as quantum computing programs on one or more quantum computing devices in one or more locations. The quantum prover 102 includes a quantum random number generator 106, a training data store 108, a first regression model 110a, and a second regression model 110b. These computing components can be connected over a network (e.g., LAN, WLAN, the Internet, or a combination thereof), which can be accessed over a wired and/or a wireless communications link.

The quantum random number generator 106 is a quantum computing device that is configured to generate randomness by measuring a quantum process (which is by nature non-deterministic). For example, the quantum random number generator 106 can be a circuit model quantum computing device that uses Hadamard gates to generate randomness, a beam splitter system that uses the intrinsic randomness of the quantum mechanical process of photonic emission to generate randomness, or another physical system that uses naturally occurring phenomena such as quantum fluctuations or radioactive decay to generate randomness. The quantum prover 102 is configured to use the quantum random number generator 106 to generate random vectors and strings of random challenges, as described in more detail below with reference to FIGS. 2 and 3.

The training data store 108 is configured to store training data for training the regression models 110a, 110b. The training data includes challenge responses generated by the classical verifier 104, as described in more detail below. The quantum prover 102 is configured to train the regression models 110a, 110b on the training data (e.g., train the regression models 110a, 110b to fit the training data as a linear function). Once trained, the quantum prover 102 can use the regression models 110a, 110b to predict challenge responses generated by the classical verifier 104 by processing new, unseen challenges. The classical verifier 104 uses predictions generated by the regression models 110a, 110b to verify randomness generated by the quantum prover 102. Example operations for training the regression models 110a, 110b and using the trained regression models 110a, 110b to verify randomness are described in more detail below with reference to FIGS. 2 and 3.

The classical verifier 104 is a classical computing system that can be implemented as one or more computer programs executed by one or more computers in one or more locations. The classical verifier 104 includes a PUF 112, a pseudorandom generator (PRG) 114, an learning parity with noise (LPN) encoder 116, and a verification module 118. These computing components can be connected over a network (e.g., LAN, WLAN, the Internet, or a combination thereof), which can be accessed over a wired and/or a wireless communications link.

The PUF 112 is a physical entity that is embodied in the physical structure of the classical verifier 104. For example, the PUF 112 can be implemented in an electrical circuit of the classical verifier 104. When a physical stimulus is applied to the PUF 112, the PUF 112 reacts due to the interaction of the stimulus with the physical microstructure of the device. The applied stimulus is called a challenge and the reaction of the PUF 112 is called a response. Contrary to standard digital systems, the PUF response depends on unavoidable nanoscale structural disorders in the hardware (e.g., introduced during manufacture), which lead to a response behavior that cannot be cloned or reproduced exactly, not even by the hardware manufacturer. That is, when a same unique challenge C is issued multiple times, the measured responses of the challenge R1, R2, R3 differ.

A same unique challenge issued to a strong PUF is guaranteed to be pseudorandom, i.e., unpredictable for a probabilistic polynomial time (PPT) adversary. However, for any unique highly-stable challenge, the output is the same with high probability. Hence, in the security model, while the PPT adversary is allowed to issue a polynomial (in terms of a chosen security parameter) number of queries, it is not allowed to issue the same query twice. This is because independence in the outputs for unique inputs is required, so that for unique inputs, a strong PUF remains indistinguishable (to a PPT adversary) from a random function. Therefore, the security game for PUFs is defined in a very similar manner to those used to establish the security of PRFs and PRGs—due to their deterministic nature. However, unlike PRFs and PRGs, PUFs are not fully deterministic-even for highly-stable challenges-which is why the term "with (very) high/low probability" is used when describing PUFs.

A specific challenge and a corresponding response form a so-called challenge-response pair (CRP). The error between a challenge and a response of the PUF 112 at an initial time and subsequent times (i.e., its variations in reproducibility) is referred to as a CRP error. A PUF can be classified as a weak PUF, if the PUF has a small number of challenge-response pairs or generates responses that are not independent but highly correlated. Conversely, a PUF can be classified as a strong PUF, if it has a large number of challenge-response pairs or generates responses that are largely independent or exhibit low correlation. Strong PUFs are sometimes preferred because they provide more entropy.

A PUF is called an implicit PUF, if it has unintended manufacturing variations as the sole source of its randomness. Conversely, a PUF is called an explicit PUF, if it uses external steps in addition to the manufacturing variations to generate randomness. In some implementations, the PUF 112 included in the classical verifier 104 is a strong, implicit PUF.

The usefulness of a PUF can be measured using two central metrics: reproducibility and uniqueness. Reproducibility is defined as $\delta=|d(PUF_{t_1}(x)-PUF_{t_2}(x))|$, where $|\cdot|$ represents an absolute value, $d(PUF_{t_1}(x)-PUF_{t_2}(x))$ represents the Hamming weight between a PUF's output $PUF_{t_1}(x)$ at time $t_1$ on input x and the PUF's output $PUF_{t_2}(x)$ at time $t_2$ on the same input x. Smaller values of $\delta$ indicate larger reproducibility and vice-versa. The reproducibility $\delta$ of a PUF can be modeled as an independent Bernoulli distributed random variable. Uniqueness is defined as $\Delta=|d(PUF_1(x)-PUF_2(x))|$, where $d(PUF_1(x)-PUF_2(x))$ represents the Hamming distance between an output generated by a first PUF $PUF_1$ on input x and an output generated by a different, second PUF $PUF_2$ on the same input x. The value of $\Delta$ is directly proportional to the uniqueness of the pair of PUFs.

PUFs can run two types of challenges: highly-stable challenges and meta-stable challenges. Highly-stable challenges are challenges with responses that follow an almost static pseudorandom mapping. Hence, highly-stable challenges have low & values and high reproducibility with standard error correction. Meta-stable challenges are challenges with responses that have a non-static distribution with 50% variation. Therefore, the responses to meta-stable challenges are random, giving them high & value and low reproducibility. In some implementations, the PUF 112 included in the classical verifier 104 is configured to process challenges that include both highly-stable and meta-stable challenges.

The classical verifier 104 is configured to use the PUF 112 to process challenges (e.g., received from the quantum prover 102) to generate corresponding CRPs. The classical verifier 104 is further configured to compute CRP errors using the CRPs and provide the computed CRP errors to the LPN encoder 116. Example operations performed using the PUF 112 are described in more detail below with reference to FIGS. 2 and 3.

The PRG 114 is a computer program that is configured to generate sequences of numbers with properties that approximate the properties of sequences of random numbers. The classical verifier 104 is configured to use the PRG 114 to generate random vectors and random matrices, as described in more detail below with reference to FIGS. 2 and 3.

The LPN encoder 116 is configured to use CRP errors to construct learning parity with noise (LPN) instances. An LPN instance can be defined as As+e, where A represents a m×n binary-valued matrix, s represents a binary-valued vector of length n, and e represents a vector of random values of length n. An LPN instance is solved by recovering s. In the LPN instances generated by the LPN encoder 116, the vector e is dependent on CRP errors generated by the PUF 112. For example, e is typically a vector of values randomly sampled from a Bernoulli distribution $X_\tau$ with bias $\tau$. Example operations performed by the LPN encoder 116 are described in more detail below with reference to FIG. 2.

The verification module 118 is configured to perform verification processes to verify and certify randomness produced by the quantum prover 102. Example operations performed by the verification module 118 are described in more detail below with reference to FIG. 3.

Figure 2:
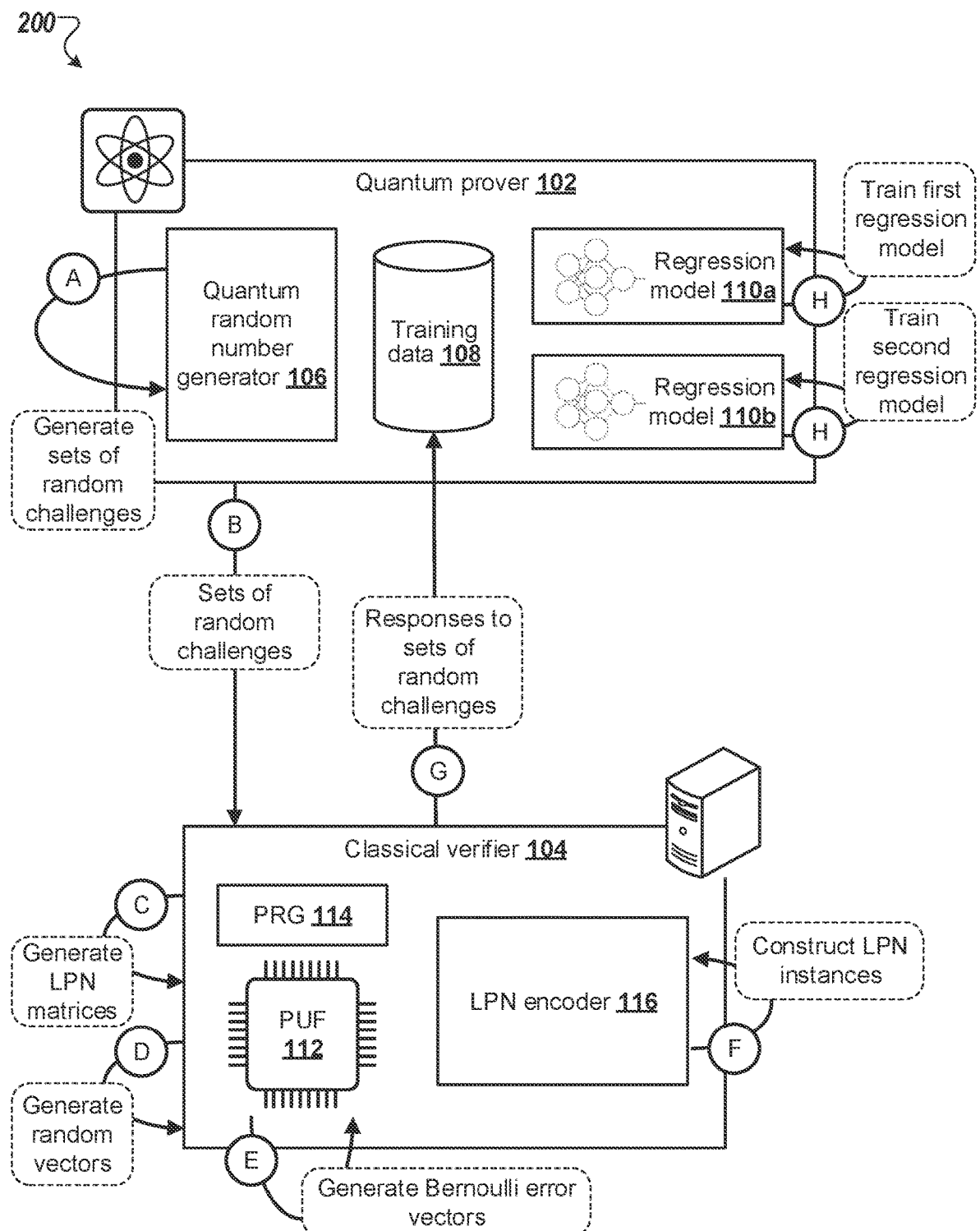
FIG. 2 is a block diagram of an example quantum verification system during an example setup process.

FIG. 2 is a block diagram 200 of the example quantum verification system 100 of FIG. 1 during an example online setup process. The block diagram 200 illustrates the example online setup process as including eight stages (A)-(H). However, in some implementations, the example online setup process can include fewer or more stages.

During stage (A) of the example setup process, the quantum prover 102 generates two sets of random challenges (e.g., using the quantum random number generator 106). Each set of random challenges includes a same number l of challenges, where each challenge is a binary valued vector of length m. That is, the quantum prover 102 generates a first set of random challenges $\{\tilde{c}_i\}_{i \in [l]}$ and a second set of random challenges $\{c_i\}_{i \in [l]}$ where $\tilde{c}_i, c_i \in \{0,1\}^m$. In some implementations the number of challenges l can be at most polynomial in the length of each challenge m.

During stage (B) of the example setup process, the quantum prover 102 sends the first and second set of random challenges to the classical verifier 104.

During stage (C) of the example setup process, the classical verifier 104 generates two matrices $\tilde{A}$ and A. The matrix $\tilde{A}$ will be used to generate an LPN instance and is therefore referred to herein as a first LPN matrix. To generate the first LPN matrix $\tilde{A}$, the classical verifier 104 uses its PRG 114 to generate two random matrices B, C where $$B \in \mathbb{F}_2^{m \times l} \text{ and } C \in \mathbb{F}_2^{l \times n}.$$

In some implementations the values m and n can be chosen using a security parameter $\lambda$, where $2^\lambda$ security is required or wanted. Then, the values m and n can be chosen according to some functions M and N such that $m=M(\lambda)$ and $n=N(\lambda)$. It suffices for the value of m to be bounded by a value that is polynomial in n. Generally, the hardness of LPN and LWE scales with $e^{-(n \log p)}$, where $p \geq 2$ is the modulus. Therefore, any value of n can be chosen as long as $e^{-(n \log p)}$ remains negligible as that is a PPT adversary's advantage in breaking LWE/LPN.

The classical verifier 104 also uses its PUF 112 to generate another matrix E of size m×n, where entries of the matrix E are sampled from a Bernoulli distribution X over $$\mathbb{F}_2^{m \times n}$$

with (small) bias τ. If a strong PUF is queried on the same set of challenges twice, and the component-wise difference is taken between the resulting vectors, then the resulting vector belongs to a specific Bernoulli distribution with high probability. The specific Bernoulli distribution (i.e., its bias) depends on the PUF. The classical verifier 104 generates the first LPN matrix Ã by computing:

$$\tilde{A} = BC + E \qquad (1)$$

By construction, the first LPN matrix Ã is a low-rank matrix and can be referred to as a "lossy" matrix. The first LPN matrix can be used to securely generate LPN instances, since BC+E is a learning with errors (LWE) instance for $$B \xleftarrow{\$} \mathbb{Z}_q^{m \times l}, C \xleftarrow{\$} \mathbb{Z}_q^{l \times n},$$

and E \$←$X^{m \times n}$(q), where n is of the order/log q and C has a kernel of size $q^{n-l}$.

The matrix A will also be used to generate an LPN instance, and is therefore referred to herein as a second LPN matrix. The second LPN matrix A is a random matrix of size m×n, where entries of the matrix A are elements of the finite field $\mathbb{F}_2$. In some implementations, the classical verifier 104 uses its PRG 114 to generate the second LPN matrix A. The second LPN matrix A can also be used to generate LPN instances that are computationally hard to solve (since by construction LPN instances are computationally hard to solve).

The classical verifier 104 also generates and stores a trapdoor $\zeta_A$ for a lattice whose basis is given by the second LPN matrix A. A trapdoor function can be defined as follows. Let n≥wd be an integer and n̄=n−wd. For $$A \in \mathbb{Z}_q^{w \times n},$$

it is said that $$R \in \mathbb{Z}_q^{\bar{n} \times wd}$$

is a trapdoor for A with tag $$H \in \mathbb{Z}_q^{w \times w} \text{ if } A \begin{bmatrix} R \\ 1 \end{bmatrix} = H \cdot G,$$

where $$G \in \mathbb{Z}_q^{w \times wd}$$

is a primitive matrix and the identity matrix 1 has dimension wd×wd. Given a trapdoor R for A, and an LWE instance B=AS+E mod q for some "short" error matrix E, LWE inversion algorithms can successfully recover S (and E) with large probability. LWE problems are considered a generalization of LPN (although the former is a lattice problem and the latter is a decoding problem that requires decoding a random linear code over $\mathbb{F}_2$). LWE requires Gaussian errors and LPN uses Bernoulli errors. However, instantiating a LWE with modulus 2 and a zero-heavy error distribution (e.g., a quite narrow discrete Gaussian) yields LPN as a zero-heavy error distribution that tends to be arbitrarily close to Bernoulli. Therefore, trapdoor algorithms that are used for LWE problems can also be used for inverting LPN instances too (even though LPN is not a lattice problem).

During stage (D) of the example setup process, the classical verifier 104 generates a random vector of length n, where entries of the random vector are elements of the finite field with two elements $\mathbb{F}_2$. That is, the classical verifier 104 generates a random vector $$s \in \mathbb{F}_2^n.$$

The classical verifier 104 can use its PRG 114 or PUF 112 to generate the random vector.

During stage (E) of the example setup process, the classical verifier 104 uses its PUF 112 to run the two sets of random challenges received during stage (B) multiple times to generate two respective sets of Bernoulli error vectors. That is, the classical verifier 104 can use its PUF 112 to process each challenge $\tilde{c}_i (1 \le i \le l)$ in the first set of random challenges multiple times to compute a first Bernoulli error vector $\tilde{e}_i (1 \le i \le l)$ and process each challenge $c_i (1 \le i \le l)$ in the second set of random challenges multiple times to compute a second Bernoulli error vector $e_i (1 \le i \le l)$. For example, the classical verifier 104 can use its PUF 112 to generate multiple responses $PUF^{(1)}(\tilde{c}_i), PUF^{(2)}(\tilde{c}_i), \ldots PUF^{(N)}(\tilde{c}_i)$ to the challenge $\tilde{c}_i$. The classical verifier 104 can use the multiple responses to compute corresponding Bernoulli errors $\tilde{e}_i$. The Bernoulli error can be computed as:

$$\tilde{e}_i = PUF^{(1)}(\tilde{c}_i) \oplus PUF^{(2)}(\tilde{c}_i) \oplus \ldots \oplus PUF^{(N)}(\tilde{c}_i) \qquad (2)$$

where ⊕ represents the XOR operator (which is used because the responses have values in $\mathbb{F}_2$). That is, the errors are computed as a difference between different responses to the same challenge.

During stage (F) of the example setup process, the classical verifier 104 generates a set of responses to the first set of random challenges received during stage (B) and a set of responses to the second set of random challenges received during stage (B). To generate the responses, the classical verifier 104 uses the LPN encoder 116 to construct LPN instances using the matrices and vectors generated during stages (C)-(E). For example, the classical verifier 104 can generate responses $\{\tilde{u}_i\}_{i \in [l]}$ to the first set of random challenges $\{\tilde{c}_i\}_{i \in [l]}$ by computing:

$$\tilde{u}_i = \tilde{A}s + \tilde{e}_i, \text{ for } 1 \le i \le l \qquad (3)$$

where Ã represents the first LPN matrix, s represents the random vector, and $e_i (1 \le i \le l)$ represents the first Bernoulli error vectors generated for each challenge in the first set of challenges. Similarly, the classical verifier 104 can generate responses $\{u_i\}_{i \in [l]}$ to the second set of random challenges $\{c_i\}_{i \in [l]}$ by computing:

$$u_i = As + e_i, \text{ for } 1 \le i \le l \qquad (4)$$

where A represents the second LPN matrix, s represents the random vector, and $e_i$ (1≤i≤l) represents the second Bernoulli error vectors generated for each challenge in the second set of challenges.

During stage (G) of the example setup process, the classical verifier 104 sends the first LPN matrix Ã, the first and second sets of responses $\{\tilde{u}_i\}_{i \in [l]}$, $\{u_i\}_{i \in [l]}$, and Ãs+e for e∈X to the quantum prover 102. The quantum prover 102 stores the first and second sets of responses as training data in the training data store 108. Because the first LPN matrix Ã is (close to) a low rank matrix, it is not guaranteed to have an inverse. However, it is possible to compute its pseudo-inverse, e.g., using the Moore-Penrose inverse computation in min ($O(n^2m)$, $O(m^2n)$) time. Since this is a one-time cost, the classical verifier 104 computes and saves the inverse or pseudoinverse of the first LPN matrix Ã.

During stage (H) of the example setup process, the quantum prover 102 trains the regression models 110a, 110b using the training data in the training data store 108. For example, the quantum prover 102 can use the first set of responses $\{\tilde{u}_i\}_{i \in [l]}$ to train the first regression model 110a to predict output values generated by the classical verifier 104 on new, unseen input challenges (e.g., by fitting the first set of responses as a linear function). Similarly, the quantum prover 102 can use the second set of responses $\{u_i\}_{i \in [l]}$ to train the second regression model 110b to predict output values generated by the classical verifier 104 on new, unseen input challenges (e.g., by fitting the second set of responses as a linear function).

Figure 3:
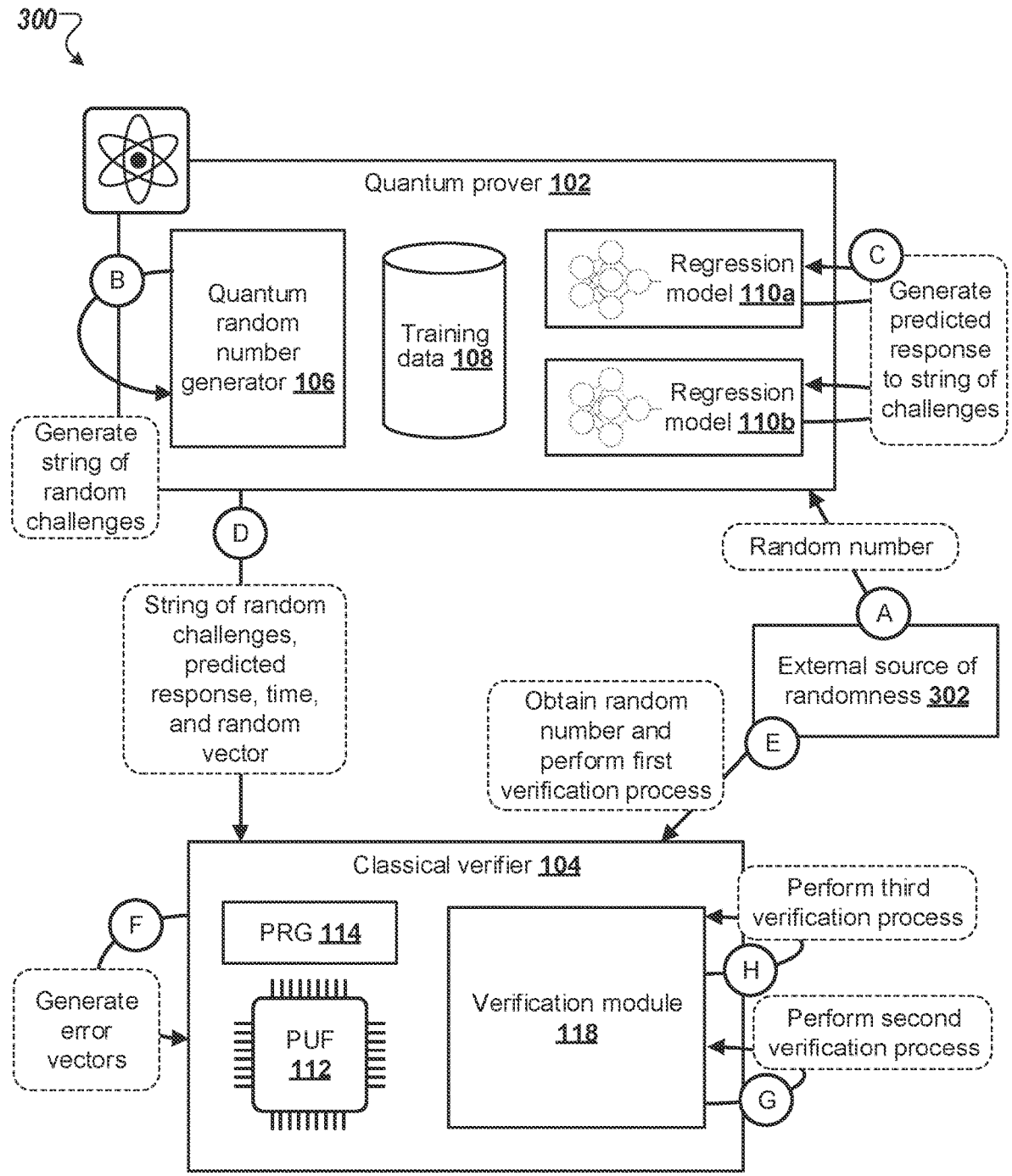
FIG. 3 is a block diagram of an example quantum verification system during an example quantum verification process.

FIG. 3 is a block diagram 300 of the example quantum verification system 100 of FIG. 1 during an example quantum verification process. The block diagram 300 illustrates the example quantum verification process as including eight stages (A)-(H). However, in some implementations the example quantum verification process can include fewer or more stages.

During stage (A) of the example quantum verification process, the quantum prover 102 obtains a random number from an external source of randomness 302 that is accessible to both the quantum prover 102 and the classical verifier 104. For example, the quantum prover 102 can observe a public source of randomness (e.g., NIST's randomness beacon) to obtain the random number. The random number can be positive or negative. In the below, in the event that the random number is even, it is denoted as E and in the event that the random number is odd, it is denoted O, so that the set of possible outcomes during stage (A) is C={E, O}. In some implementations, the quantum prover 102 can obtain the random number at a pre-determined time t agreed by both the quantum prover 102 and the classical verifier 104.

During stage (B) of the example quantum verification process, the quantum prover 102 generates a m-bit string of random challenges q E $\{0,1\}$ m. For example, the quantum prover 102 can use the quantum random number generator 106 to generate the string of random challenges.

During stage (C) of the example quantum verification process, the quantum prover 102 generates a predicted response to the string of random challenges using one of the regression models 110a, 110b trained in the setup process. For example, without loss of generality, if the random number observed during stage (A) is an even number C=E, the quantum prover 102 processes the string of random challenges using the first regression model 110a to generate a predicted response $\tilde{u}_q$. Conversely, if the random number observed during stage (A) is an odd number C=O, the quantum prover 102 processes the string of random challenges using the second regression model 110b to generate a predicted response $u_q$.

During stage (D) of the example quantum verification process, the quantum prover 102 sends a set of values to the classical verifier 104. The set of values includes: the time t at which the quantum prover 102 obtained the random number during stage (A), the challenge string q generated during stage (B), the predicted response $u_q$ or $\tilde{u}_q$ generated during stage (C), and a vector y generated by the quantum prover 102, where the vector is of length m and has entries from the finite field with two elements $\mathbb{F}_2$. That is, the quantum prover 102 sends ⟨t, y, $u_q$, q⟩ for event O or sends ⟨t, y, $\tilde{u}_q$, q⟩ for event E.

The vector y is computed as y=Ãx+e*, where Ã was sent to the quantum prover 102 during the setup process, $$x \in \mathbb{F}_2^n$$

is a random vector, and e* is an m-dimensional Bernoulli vector. The Bernoulli vector e* is generated as follows. If the random number observed during stage (A) is an odd number C=O, the quantum prover 102 inputs the string of random challenges q into the first regression model to obtain a first output h=As+e. The quantum prover 102 also computes a canonical representation q'∈ $\{0,1\}^m$ of the first LPN matrix Ã, e.g., using a Hash function H:$\{0,1\}^* \to \{0,1\}^m$ and inputs the canonical representation q' into the first regression model to obtain a second output h'=As+e'. The quantum prover 102 computes e* as the difference between the first output and the second output, i.e., e*=|h−h'|=|e−e'|. If the random number observed during stage (A) is an even number C=E, the quantum prover 102 inputs the string of random challenges q and the canonical representation q'∈ $\{0,1\}^m$ of the first LPN matrix Ã into the second regression model to obtain outputs h=Ãs+e and h'=Ãs+e', respectively. The quantum prover 102 then computes e* as the difference between the outputs, i.e., e*=|h−h'|=|e−e'|. It is known that pairs of such vectors y and responses $u_q$ are (trapdoor) claw-free functions.

The quantum prover 102 can use the y and $\tilde{u}_q$ (or $u_q$) values it generates to hold an equal superposition of x and x−s̃(or x−s, respectively), e.g., in the quantum state $$\frac{1}{\sqrt{2}}(|0, x\rangle + |1, x - \tilde{s}\rangle).$$

In more detail, let g=Ãs+e—which was sent by the classical verifier 104 to the quantum prover 102 during the setup process. It can be shown that an LPN instance is a trapdoor claw-free function (TCF). In a TCF family, a pair of functions $f_0$, $f_1$ exist such that $f_0(x)=f_1(x')=Q$. With LPN (or LWE), $f_0(x)$ can be defined as $f_0(x)$=Ãx+e* and $f_1(x)$=Ãx+e*+g=Ã(x+s)+e', where e'=e+e*. Therefore, $f_1(x)=f_0(x+s)$+e for some small Bernoulli error e, which can be removed using the pseudoinverse of Ã and rounding, leading to $f_1(x)=f_0(x+s)$. This means that all pairs of the form (x, x', Q) where x=x'−s is a claw. A quantum computing device can use such TCF family to set up a superposition over a claw:

$$\frac{1}{\sqrt{2}}(|0, x\rangle + |1, x - \tilde{s}\rangle).$$

This is possible for LPN over the finite field $\mathbb{F}_2$ since working over a modulus greater than 2 requires converting all entries to binary strings. With LPN over $\mathbb{F}_2$, this can be done by creating a superposition in three quantum registers of physical qubits: $\Sigma_b \Sigma_x \Sigma_{e*} |b\rangle |x\rangle |\tilde{A}x+e*+bg\rangle$, for $b \in \{0, 1\}$. Measuring the third quantum register yields Q, and means that the intended superposition is realized between the first two quantum registers. This allows the quantum computer to hold an equal superposition of x and x−s without even knowing s. Furthermore, the (quantum) hardness of LWE/LPN makes it infeasible to compute s from x and x−s, over $\mathbb{F}_2$ (it can be computed efficiently via Hadamard/Fourier transform when the modulus is greater than 2).

During stage (E) of the example quantum verification process, the classical verifier 104 accesses the external source of randomness 302 to obtain the random number that was generated by the external source of randomness 302 at time t (as specified by the data received during stage (D)). In implementations where the time t is pre-determined, the classical verifier 104 can also perform a first verification process by verifying that the time sent by the quantum prover 102 during stage (D) is the pre-determined time. In such implementations, if the time sent by the quantum prover 102 during stage (D) is not equal to the pre-determined time, the classical verifier 104 can abort the quantum verification process.

During stage (F) of the example quantum verification process, the classical verifier 104 uses its PUF 112 to process the challenge string q twice to generate two strings of responses. The classical verifier 104 can then use the two strings of responses to compute a corresponding Bernoulli error vector $\hat{e} \in X$, where X represents a Bernoulli distribution over the finite field $\mathbb{F}_2$ with bias $\tau$ and the Bernoulli error vector $\hat{e}$ is of length m (e.g., by computing the XOR of the two strings of responses).

During stage (G) of the example quantum verification process, the classical verifier 104 uses the verification module 118 to perform a second verification process. The operations performed during stage (G) depend on whether the random number obtained by the classical verifier 104 during stage (E) is even or odd. In the case that the random number is odd, the classical verifier 104 computes a difference between the predicted response $u_q$ received during stage (D) and the Bernoulli error vector $\hat{e}$ computed during stage (F). That is, the classical verifier 104 computes:

$$\hat{u} = u_q - \hat{e} \quad (5)$$

The classical verifier 104 computes a product of the inverse of the second LPN matrix generated and stored during the setup phase and the computed difference. That is, the verification module 118 computes:

$$\hat{s} = A^{-1}\hat{u} \quad (6)$$

The classical verifier 104 computes the Hamming distance between s and the random vector s generated during the online setup phase and determines whether the Hamming distance is within a predetermined acceptable range If the Hamming distance is not within the predetermined acceptable range, the classical verifier 104 can abort the quantum verification process. Due to properties including the reproducibility of strong PUFs, it can be shown that the Hamming distance can be equal to m/c for any constant c<m. Therefore, the predetermined range can be upper bounded by m/c, e.g., where in some implementations c=3.

In the case that the random number is even, the classical verifier 104 computes a difference between the predicted response $\tilde{u}_q$ received during stage (D) and the Bernoulli error vector $\hat{e}$ computed during stage (F). That is, the classical verifier 104 computes:

$$\hat{u} = \tilde{u}_q - \hat{e} \quad (7)$$

The classical verifier 104 computes a product of the inverse of the first LPN matrix generated during the setup phase and the computed difference. That is, the classical verifier 104 computes:

$$\hat{s} = \tilde{A}^{-1}\hat{u} \quad (8)$$

The classical verifier 104 computes the Hamming distance between $\hat{s}$ and the random vector $\tilde{s}$ generated during the online setup phase and determines whether the Hamming distance is within the predetermined acceptable range. If the Hamming distance is not within the predetermined acceptable range, the classical verifier 104 can abort the quantum verification process.

The second verification process performed during stage (G) is effective due to the use of the PUF 112 and the procedure used to trained the regression models 110a, 110b during the setup phase, since it then follows that the Hamming distance between the Bernoulli error vector $\hat{e}$ and a Bernoulli error vector eg for challenge string q also lies within the predetermined acceptable range (because the regression models 110a, 110b generate predicted outputs that take the form of LPN instances).

If both the first and second verification processes performed during stage (E) and (G) pass, the classical verifier 104 performs stage (H) of the example quantum verification process. During stage (H), the classical verifier 104 performs a third verification process to determine whether to certify the quantum behavior of the quantum prover 102. The classical verifier 104 generates another random number $C\$ \leftarrow \{0, E\}$. The operations performed then depend on whether the generated random number is even or odd. Generating a new random number before running the below operations disallows the quantum prover an opportunity to cheat, because if the original random number was used there would be no entropy from C as the quantum prover would already know its value from the time it generate the vector y and predicted responses $\tilde{u}_q$ and $u_q$.

In the case that the random number is even, the classical verifier 104 runs a so-called generation round. In the generation round, the classical verifier 104 sends the random number C to the quantum prover 102 (or sends a bit that represents the parity of the random number to the quanutm prover). In response, the quantum prover 102 determines whether the random number is even or odd, and, if even, measures the superposition state of x and x−s in the computational basis to randomly obtain a measurement outcome b=0 or b=1. If the measurement outcome is b=0, the quantum prover 102 sends a bit b=0 and the vector x to the classical verifier 104. If the measurement outcome is b=1, the quantum prover 102 sends a bit b=1 and the vector x−s to the classical verifier 104. The classical verifier 104 verifies the randomness of the bit b it receives. If the bit is b=0, the classical verifier 104 computes $\|y-\tilde{A}x-b\tilde{u}_q\| = \|\tilde{A}x+e-\tilde{A}x-0\| = \|e\|$, where $\|\cdot\|$ represents the norm, $\tilde{A}$ is the first LPN matrix generated by the classical verifier 104 during the setup phase, and $\tilde{u}_q$ is the predicted response received by the classical verifier 104 during stage (D). If the bit is b=1, the classical verifier 104 computes $\|y-\tilde{A}x-b\tilde{u}_q\| = \|\tilde{A}x+e-\tilde{A}x+\tilde{A}s-\tilde{A}s-e'\| = \|e''\|$ where e''=e'−e. The classical verifier 104 then determines whether:

$$\|e\| \leq \tau\sqrt{m} \text{ or } \|e''\|\tau\sqrt{m} \quad (9)$$

where τ is the bias of the Bernoulli distribution described during stage (F) and m is the number of rows in the first LPN matrix. If it is determined that $\|e\| \tau \sqrt{m}$ (or $\|e"\| \leq \tau \sqrt{m}$) the quantum randomness of the bit b s is verified and the classical verifier 104 certifies the quantum randomness. Otherwise, if $\|e\|$ or $\|e"\| \leq \tau \sqrt{m}$, the verification of the quantum randomness fails and the classical verifier 104 does not certify the quantum randomness.

In the case that the random number is odd, the classical verifier 104 runs a so-called test round. In the test round, the classical verifier 104 sends the random number to the quantum prover 102. In response, the quantum prover 102 determines whether the random number is even or odd, and, if odd, uses the Hadamard basis to perform two successive measurements of the superposition of x and x−s to obtain an n-bit vector d and a bit c, respectively, such that c=d·(x⊕(x−s)) mod 2. The first measurement does not measure all qubits and the remaining qubits are measured by the second measurement. In some implementations the first measurement can be performed on all but one qubit, outputting d, and the second measurement can be performed on the remaining one qubit to obtain c.

The classical verifier 104 computes a product of the second LPN matrix A and a pseudoinverse of the first LPN matrix Ã and also computes y−é, where é is obtained by computing the difference between the output of its PUF on the challenge string q and q' (which is the canonical representation of Ã in $\{0,1\}^m$). It follows that y'=y−é=Ãx+∈ where ∈∈X for a Bernoulli distribution X over $$\mathbb{F}_2^m$$

with bias τ*<<τ (the smaller bias follows from the precision of the regression model). The classical verifier 104 then computes AÃ+y'=Ax+∈' (using properties of the Moore-Penrose pseudoinverse). It is noted that ∈'=AÃ+∈, which yields a vector with a Hamming weight (i.e., bias for the Bernoulli distribution) that is higher than τ*. However, this is still within acceptable limits since the Hamming weight of e is much smaller than τ (which is the error bias of the classical verifier's PUF) and AÃ+ is sparse.

The classical verifier 104 uses the trapdoor $\zeta_A$ stored during the setup process to compute a vector $x_0$ by inverting Ax+∈' such that $$y = Ax_0 + e_0 \text{ where } x_0 \in \mathbb{F}_2^n$$

and $e_0 \in x$ for some Bernoulli distribution over $$\mathbb{F}_2^m$$

with bias τ'≤τ. The classical verifier 104 uses the trapdoor to perform the inversion of Ax+∈' to increase the probability that the obtained $x_0$ is a correct value, i.e., to increase the precision, e.g., compared to inversions performed using a pseudoinverse. This increase in precision is particularly beneficial in the test round (as opposed to the generation round) because the verification in the test round requires extra precision—in the generation round, only a certain upper bound on the norm must be satisfied, but in the test round, an equality must hold.

The classical verifier 104 verifies the randomness of the bit c by determining whether:

$$d \neq 0 \text{ and } c = d \cdot (x) \oplus (x_0 - s)). \tag{10}$$

If it is determined that both conditions are satisfied, the quantum randomness of the bit c is verified and the classical verifier 104 certifies the quantum randomness. If not, the verification of the quantum randomness fails and the classical verifier 104 does not certify the quantum randomness. The correctness of the verification works because the post-quantum cryptographic hardness of LPN (which is used to construct a trapdoor claw-free function) and the restrictions of quantum mechanics imply that the quantum prover cannot hold a single preimage (x or x−s) for y at the same time as string d and bit c. Hence, it must be holding the preimages in equal superposition, which means that in order to pass both tests, a quantum prover must behave honestly, leading to a random b.

As shown, the example quantum verification process has only one round of communication between the quantum prover 102 and the classical verifier 104 per verification round (the verification initiation request is typically not counted as a communication cost). In addition, the single round of communication not only verifies the quantum prover's randomness, but also authenticates the classical verifier 104 to the quantum prover 102. Furthermore, known verification processes (different to the present disclosure) can require the verifier to follow different protocols for the generation and test rounds with the former requiring the lossy matrix and the latter using a LWE matrix with its trapdoor. Therefore, these solutions require sending different parameters and information for the generation and test rounds. Therefore, the presently described quantum verification process seamlessly realizes efficient quantum verification, which allows generation of certifiable randomness without requiring wasted communication that must be adapted according to the verification round.

The correctness of the example quantum verification process follows from one or more of the following features: the external source of randomness is truly random (e.g., through the use of quantum mechanics) and generates new public randomness at regular intervals (e.g., every minute). Therefore, the event C∈{E, 0} is guaranteed to take a random value which cannot be controlled by the quantum prover 102. This allows the quantum prover 102 to differentiate between the two regression models and does not add any advantage for a cheating quantum prover. Further, the example quantum verification process saves on communication rounds (e.g., compared to other existing quantum verification solutions) and this saving does not incur any security loss because the training data used to train the regression models is generated as LPN instances using PUFs. Further, the second verification process uses the properties of the classical verifier's PUF, which is a secure cryptographic hardware-based function. Therefore, it's security holds trivially.

Figure 4:
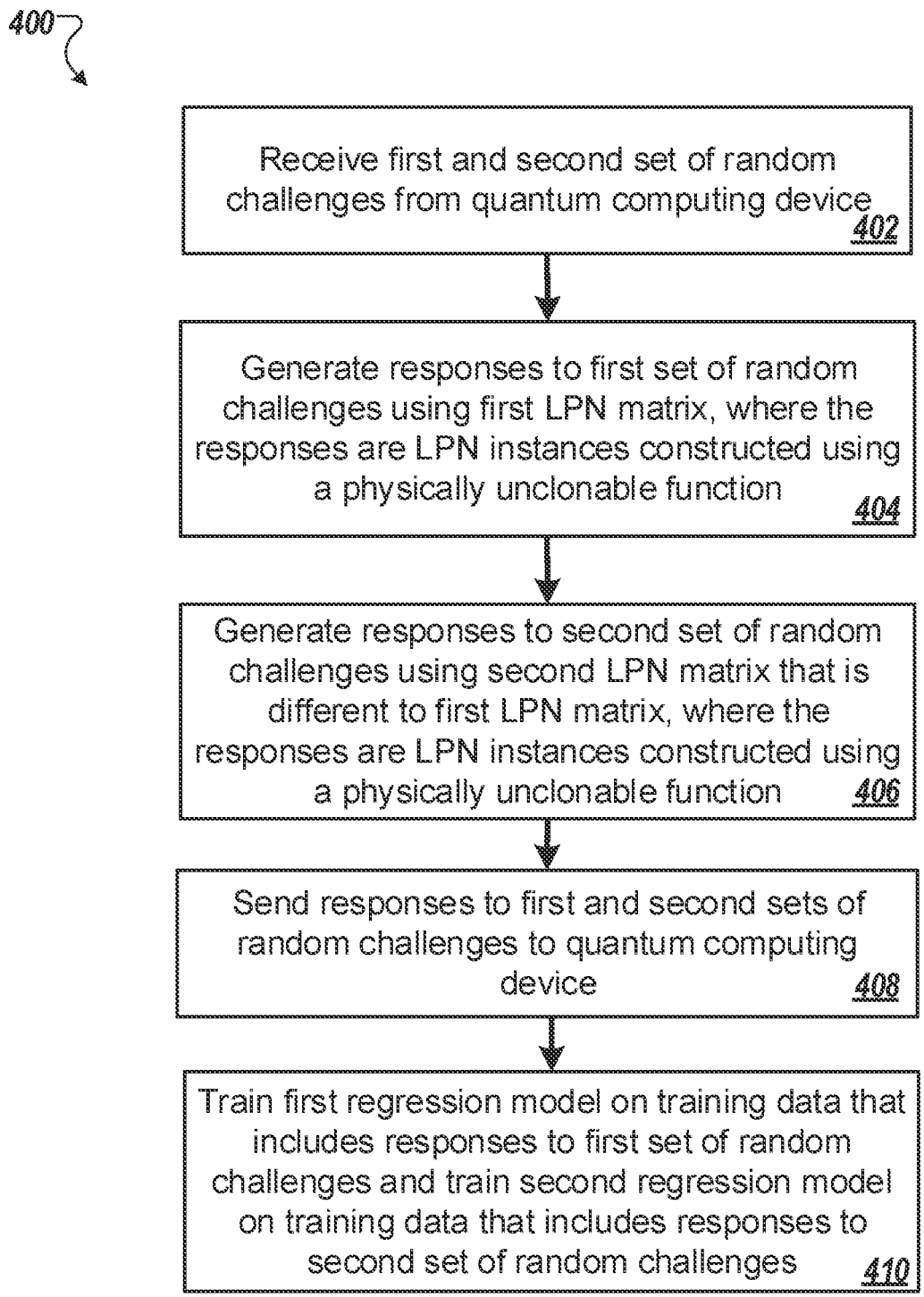
FIG. 4 is a flowchart of an example process to setup a quantum verification system.

FIG. 4 is a flowchart of an example process 400 to setup a quantum verification system. For convenience, the process 400 will be described as being performed by a system of one or more classical and quantum computers located in one or more locations. For example, the quantum prover 102 and classical verifier 104 of FIG. 1, appropriately programmed, can perform example process 400. Although the flowchart depicts the various stages of the process 400 occurring in a particular order, certain stages may in some implementations be performed in parallel or in a different order than what is depicted in the example process 400 of FIG. 4.

A classical computing device included in the system receives a first set of random challenges and a second set of random challenges from the quantum computing device (step 402). In response, the classical computing device computes a set of responses to the first set of random challenges and a set of responses to the second set of random challenges. The responses include LPN instances generated using a PUF included in the classical computing device. In some implementations the PUF is a strong implicit PUF.

To generate the set of responses to the first set of random challenges, the classical computing device uses the PUF to generate a first LPN matrix. The classical computing device generates two random binary-valued matrices (e.g., using a pseudorandom generator or the PUF) and generates a matrix with entries sampled from a Bernoulli distribution (e.g., using the PUF). The classical computing device multiplies the two random binary-valued matrices and adds the matrix with entries sampled from a Bernoulli distribution to the multiplied random binary-valued matrices to obtain the first LPN matrix. For example, the classical computing device computes the quantity given by Eq. (1) above. The classical computing device stores the first LPN matrix for use in a subsequent verification process.

The classical computing device then generates a random binary-valued vector (e.g., using a pseudorandom generator or the PUF). The classical computing device stores the random vector for use in a subsequent verification process.

The classical computing device uses the PUF to process the first set of random challenges and, in turn, uses the PUF outputs to generate a first Bernoulli error vector, e.g., according to Eq. (2) above. The classical computing device constructs an LPN instance using the first LPN matrix, random vector, and first Bernoulli error vector. The classical computing device multiplies the first LPN matrix by the random vector and adds the first Bernoulli error vector to obtain the set of responses to the first set of random challenges (step 404). For example, the classical computing device computes the responses given by Eq. (3) above.

To generate the set of responses to the second set of random challenges, the classical computing device generates a second LPN matrix and a trapdoor function for the second LPN matrix. The second LPN matrix has the same dimensions as the first LPN matrix. The classical computing device stores the second LPN matrix and the trapdoor function for use in a subsequent verification process.

The classical computing device uses the PUF to process the second set of random challenges and, in turn, uses the PUF outputs to generate a second Bernoulli error vector, for example, according to Eq. (2) above. The classical computing device constructs an LPN instance using the second LPN matrix, the random vector, and second Bernoulli error vector. The classical computing device multiplies the second LPN matrix by the random vector and adds the second Bernoulli error vector to obtain the set of responses to the second set of random challenges (step 406). For example, the classical computing device computes the responses given by Eq. (4) above.

The classical computing device sends the set of responses to the first set of random challenges and the set of responses to the second set of random challenges to the quantum computing device (step 408). The quantum computing device trains a first regression model to predict challenge responses generated by the classical computing device on training data comprising the set of responses to the first set of random challenges and trains a second regression model to predict challenge responses generated by the classical computing device on training data including the set of responses to the second set of random challenges (step 410).

Figure 5:
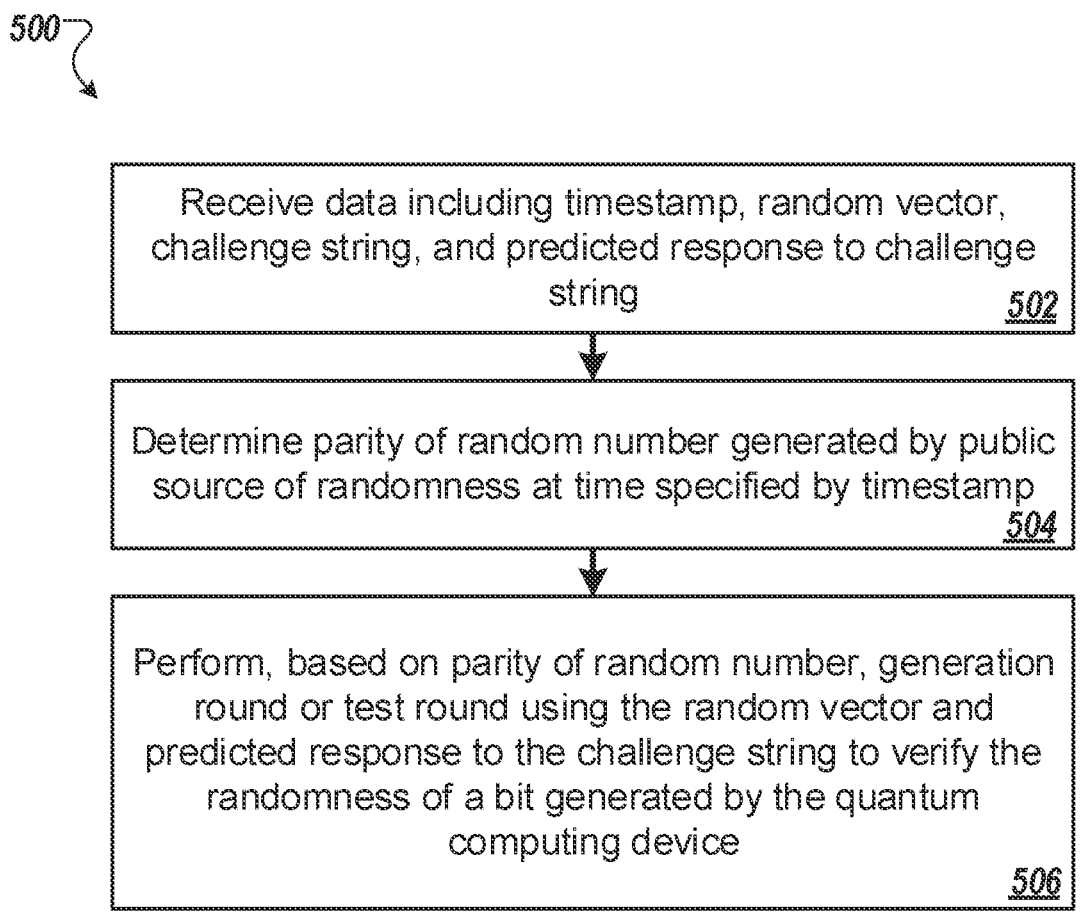
FIG. 5 is a flowchart of an example process for verifying randomness produced by a quantum computing device.

FIG. 5 is a flowchart of an example process 500 for verifying randomness produced by a quantum computing device. For convenience, the process 500 will be described as being performed by a system of one or more computers located in one or more locations. For example, the classical verifier 104 of FIG. 1, appropriately programmed, can perform example process 500. Although the flowchart depicts the various stages of the process 500 occurring in a particular order, certain stages may in some implementations be performed in parallel or in a different order than what is depicted in the example process 500 of FIG. 5.

A classical computing device included in the system receives data from the quantum computing device (step 502). For example, the quantum computing device can observe a random number output by an external source of randomness that is accessible to both the classical computing device and the quantum computing device (e.g., a public source of randomness such as the NIST randomness beacon). The random number can be odd or even.

The quantum computing device can generate a challenge string using, for example, a quantum random number generator. If the random number obtained from the external source of randomness is even, the quantum computing device can query a first regression model with the challenge string to obtain a predicted response to the challenge string. Alternatively, if the random number is odd, the quantum computing device can query a different, second regression model with the challenge string to obtain a predicted response to the challenge string. The first regression model and second regression model are models that have been trained on respective training data to fit LPN instances generated by the classical computing device as a linear function, as described above with reference to example process 400 of FIG. 4.

The quantum computing device can generate a binary-valued vector and send data that includes: a timestamp that specifies the time at which the quantum computing device observed the random number, the binary-valued vector, the challenge string, and the predicted response to the challenge string to the classical computing device at step 502.

In response to receiving the data from the quantum computing device, the classical computing device accesses the external source of randomness and obtains a random number output by the external source of randomness at the time specified by the timestamp. The classical computing device determines the parity of the random number (step 504).

In some implementations, the quantum computing device can observe the random number output by the external source of randomness at a predetermined time that is known to both the quantum computing device and the classical computing device. In such implementations, the classical computing device can perform a first verification process at step 504 by verifying that the time specified by the timestamp is equal to the predetermined time. For example, the classical computing device can determine whether the time specified by the timestamp is equal to the predetermined time. In response to determining that the time specified by the timestamp is equal to the predetermined time, the classical computing device can continue the verification process 500. However, in response to determining that the time specified by the timestamp is not equal to the predetermined time, the classical computing device can abort the verification process 500.

In some implementations the classical computing device can perform a second verification process at step 504 using the challenge string included in the data received from the quantum computing device. The classical computing device can use its PUF to process the challenge string to compute a Bernoulli error vector. For example, the classical computing device can use the PUF to process the challenge string twice to obtain pairs of responses to challenges in the challenge string. The classical computing system can compute a Bernoulli error vector using the pairs of responses (e.g., by computing a XOR of the pairs of responses as described above with reference to Eq. (2)).

The classical computing device computes a difference between the predicted response to the challenge string included in the data received from the quantum computing device and the Bernoulli error vector. For example, the classical computing device computes the quantity given by Eq. (5) or (7) (depending on whether the quantum computing device sent a predicted response generated by the first or second regression model). The classical computing device determines whether a Hamming distance between i) a product of an inverse of a pre-stored LPN matrix and the difference and ii) a pre-stored random vector is within a predetermined range. That is, if the parity of the random number determined at step 504 is even, the classical computing device uses a first LPN matrix (generated and stored during the setup process) and a random vector (generated and stored during the setup process) to compute the quantity given by Eq. (8), or, if the parity of the random number is odd, the classical computing device uses a second LPN matrix (generated and stored during the setup process) and the random vector (generated and stored during the setup process) to compute the quantity given by Eq. (6).

In response to determining that the Hamming distance is within the predetermined range, the classical computing device can continue the verification process. However, in response to determining that the Hamming distance is outside of the predetermined range, the classical computing device can abort the verification process 500.

The classical computing device then performs, based on the parity of the random number, either a generation round or a test round to verify the randomness of a bit generated by the quantum computing device (step 506). For example, the classical computing device can perform the generation round if the parity of the random number is even or perform the test round if the parity of the random number is odd.

The generation round uses the binary-valued vector and predicted response to the challenge string to verify a pre-image of the binary-valued vector generated by the quantum computing device. To perform the generation round, the classical computing device can send data representing the parity of the random number to the quantum computing device. The quantum computing device can then authenticate the classical computing device by confirming that the parity of the random number obtained by the classical computing device is the same as the parity of the random number obtained by the quantum computing device. In response to positively authenticating the classical computing device, the quantum computing device can generate and send a bit and a preimage of the binary-valued vector (sent at step 502) to the classical computing device.

The classical computing device determines whether a norm of the binary-valued vector minus a first LPN matrix multiplied by the preimage minus the bit multiplied by the predicted response to the challenge string is less than an upper bound given by a Bernoulli distribution bias multiplied by a square root of a length of the binary-valued vector, where the Bernoulli distribution is used to generate the first LPN matrix. For example, the classical computing device determines whether Eq. (9) holds. In response to determining that the norm is less than the upper bound, the classical computing device verifies the bit as a random bit.

The test round uses the binary-valued vector to verify an equation generated by the quantum computing device. To perform the test round, the classical computing device can send data representing the parity of the random number to the quantum computing device. The quantum computing device can authenticate the classical computing device by confirming that the parity of the random number obtained by the classical computing device is the same as the parity of the random number obtained by the quantum computing device. In response to positively authenticating the classical computing device, the quantum computing device can generate and send a bit and a binary string to the classical computing device.

The classical computing device determines whether the bit is equal to a product of the binary string and a XOR of a vector and a difference between the vector and a pre-stored random vector, where the vector multiplied by a second LPN matrix and added to a Bernoulli error vector is equal to the binary-valued vector. That is, the classical computing device determines whether Eq. (10) holds. The classical computing device can use a pre-stored trapdoor function for the second LPN matrix to obtain the vector. In response to determining that the bit is equal to the product, the classical computing device verifies the bit as a random bit.

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for verifying randomness produced by a quantum computing device, the method comprising:

receiving, by a classical computing device and from the quantum computing device, data comprising a timestamp, a binary-valued vector, and a predicted response to a challenge string, wherein the predicted response to the challenge string is generated by the quantum computing device using a regression model that has been trained on training data during a setup process to fit learning parity with noise (LPN) instances as a linear function, and the LPN instances are constructed by the classical processing device using a physically unclonable function (PUF);

determining, by the classical computing device, a parity of a random number output by a public source of randomness at a time specified by the timestamp; and performing, by the classical computing device and based on the parity of the random number, either a generation round or a test round to verify the randomness of a bit generated by the quantum computing device, wherein
the generation round uses the binary-valued vector and predicted response to the challenge string to verify a preimage of the binary-valued vector generated by the quantum computing device, and
the test round uses the binary-valued vector to verify an equation generated by the quantum computing device.

2. The method of claim 1, wherein the time specified by the timestamp comprises a predetermined time agreed by the classical computing device and the quantum computing device, and wherein the method further comprises:

determining, by the classical computing device, whether the time specified by the timestamp is equal to the predetermined time; and in response to determining that the time specified by the timestamp is equal to the predetermined time, performing the generation round or the test round.

3. The method of claim 2, further comprising, in response to determining that the time specified by the timestamp is not equal to the predetermined time, aborting, by the classical computing device, the verification of randomness.

4. The method of claim 1, wherein the data further comprises a challenge string and the method further comprises:

processing, by the classical computing device and using the PUF, the challenge string to compute a Bernoulli error vector;

computing, by the classical computing device, a difference between the predicted response to the challenge string and the Bernoulli error vector;

determining, by the classical computing device, whether a Hamming distance between i) a product of an inverse of a pre-stored LPN matrix and the difference and ii) a pre-stored random vector is within a predetermined range; and in response to determining that the Hamming distance is within the predetermined range, performing the generation round or the test round.

5. The method of claim 4, further comprising, in response to determining that the Hamming distance is outside of the predetermined range, aborting the verification of randomness.

6. The method of claim 4, wherein processing the challenge string to compute the Bernoulli error vector comprises:

processing, using the PUF, the challenge string twice to obtain pairs of responses to challenges in the challenge string; and computing a Bernoulli error vector using the pairs of responses, comprising, for a j-th entry of the Bernoulli error vector, computing a XOR of the pair of responses to a j-th challenge in the challenge string.

7. The method of claim 1, further comprising performing the setup process, comprising:

receiving, by the classical computing device and from the quantum computing device, a first set of random challenges and a second set of random challenges;

computing, by the classical computing device, a set of responses to the first set of random challenges and a set of responses to the second set of random challenges, wherein the set of responses to the first set of random challenges include a first set of LPN instances generated using the PUF and the set of responses to the second set of random challenges include a second set of LPN instances generated using the PUF, wherein the first set of LPN instances are different to the second set; and sending, from the classical computing device, the set of responses to the first set of random challenges and the set of responses to the second set of random challenges to the quantum computing device.

8. The method of claim 7, wherein the quantum computing device trains a first regression model to predict challenge responses generated by the classical computing device on training data comprising the set of responses to the first set of random challenges and trains a second regression model to predict challenge responses generated by the classical computing device on training data comprising the set of responses to the second set of random challenges.

9. The method of claim 7, wherein computing the set of responses to the first set of random challenges comprises:

generating and storing, by the classical computing device and using the PUF, a first LPN matrix, wherein the first LPN matrix comprises two random matrices and a matrix with entries sampled from a Bernoulli distribution;

generating and storing, by the classical computing device, a random vector;

processing, by the classical computing device and using the PUF, the first set of random challenges to generate a first Bernoulli error vector; and multiplying the first LPN matrix by the random vector and adding the first Bernoulli error vector to obtain the set of responses to the first set of random challenges, wherein the classical computing device sends the first LPN matrix to the quantum computing device.

10. The method of claim 7, wherein computing the set of responses to the second set of random challenges comprises:
generating and storing, by the classical computing device, a second LPN matrix and a trapdoor function for the second LPN matrix;
generating and storing, by the classical computing device, a random vector;
processing, by the classical computing device and using the PUF, the second set of random challenges to generate a second Bernoulli error vector; and
multiplying the second LPN matrix by the random vector and adding the second Bernoulli error vector to obtain the set of responses to the second set of random challenges.

11. The method of claim 9, wherein the first LPN matrix comprises a product of the two random matrices added to the matrix with entries sampled from a Bernoulli distribution.

12. The method of claim 1, wherein performing the generation round or the test round comprises sending, from the classical computing device, a second random number to the quantum computing device, wherein the quantum computing device generates a bit and a preimage of the binary-valued vector or generates a bit and a binary string based on a parity of the second random number.

13. The method of claim 12, wherein performing the generation round comprises:
receiving a bit and a preimage of the binary-valued vector from the quantum computing device, wherein the bit is obtained through measurement of a quantum state that represents a superposition of preimages of the binary-valued vector;
determining whether a norm of the binary-valued vector minus a first LPN matrix multiplied by the preimage minus the bit multiplied by the predicted response to the challenge string is less than an upper bound given by a Bernoulli distribution bias multiplied by a square root of a length of the binary-valued vector, wherein the Bernoulli distribution is used to generate the first LPN matrix; and
in response to determining that the norm is less than the upper bound, verifying the bit as a random bit.

14. The method of claim 12, wherein performing the test round comprises:
receiving a bit and a binary string from the quantum computing device;
determining whether the bit is equal to a product of the binary string and a XOR of a vector and a difference between the vector and a pre-stored random vector, wherein the vector multiplied by a second LPN matrix and added to a Bernoulli error vector is equal to the binary-valued vector; and
in response to determining that the bit is equal to the product, verifying the bit as a random bit.

15. The method of claim 14, further comprising using a trapdoor function for the second LPN matrix to obtain the vector.

16. The method of claim 1, further comprising generating, by the quantum computing device, the data, comprising:
observing a random number output by a public source of randomness, wherein the random number comprises an even or an odd random number;
generating the challenge string;
determining whether the random number is even or odd;
in response to determining that the random number is even, querying a first regression model with the challenge string to obtain the predicted response to the challenge string; or
in response to determining that the random number is even, querying a second regression model with the challenge string to obtain the predicted response to the challenge string, wherein the first regression model and the second regression model have been trained on different training data;
generating the binary-valued vector; and
using the binary-valued vector and the predicted response to the challenge string to generate a superposition of preimages of the binary-valued vector.

17. The method of claim 1, wherein the classical processing device performs the generation round, if the parity of the random number is even or performs the test round, if the parity of the random number is odd.

18. The method of claim 1, wherein the PUF comprises a strong implicit PUF.

19. A classical computing system comprising one or more computers and one or more storage devices storing instructions that are operable, when executed by the one or more computers, to cause the one or more computers to perform operations for verifying randomness produced by a quantum computing device, the operations comprising:
receiving, from the quantum computing device, data comprising a timestamp, a binary-valued vector, and a predicted response to a challenge string, wherein the predicted response to the challenge string is generated by the quantum computing device using a regression model that has been trained on training data during an setup process to fit learning parity with noise (LPN) instances as a linear function, and the LPN instances are constructed by the classical processing system using a physically unclonable function (PUF);
determining a parity of a random number output by a public source of randomness at a time specified by the timestamp; and
performing, based on the parity of the random number, either a generation round or a test round to verify the randomness of a bit generated by the quantum computing device, wherein
the generation round uses the binary-valued vector and predicted response to the challenge string to verify a preimage of the binary-valued vector generated by the quantum computing device, and
the test round uses the binary-valued vector to verify an equation generated by the quantum computing device.

20. A computer-readable storage medium comprising instructions stored thereon that are executable by a classical processing device and upon such execution cause the processing device to perform operations for verifying randomness produced by a quantum computing device, the operations comprising:
receiving, from the quantum computing device, data comprising a timestamp, a binary-valued vector, and a predicted response to a challenge string, wherein the predicted response to the challenge string is generated by the quantum computing device using a regression model that has been trained on training data during an setup process to fit learning parity with noise (LPN) instances as a linear function, and the LPN instances are constructed by the classical processing device using a physically unclonable function (PUF);
determining a parity of a random number output by a public source of randomness at a time specified by the timestamp; and performing, based on the parity of the random number, either a generation round or a test round to verify the randomness of a bit generated by the quantum computing device, wherein
- the generation round uses the binary-valued vector and predicted response to the challenge string to verify a preimage of the binary-valued vector generated by the quantum computing device, and
- the test round uses the binary-valued vector to verify an equation generated by the quantum computing device.

* * * * *